(12) United States Patent
Cui et al.

(10) Patent No.: US 11,384,414 B2
(45) Date of Patent: Jul. 12, 2022

(54) NICKEL-BASED SUPERALLOYS

(71) Applicant: General Electric Company, Schenectady, NY (US)

(72) Inventors: Yan Cui, Greer, SC (US); Jon Conrad Schaeffer, Greenville, SC (US); Michael Douglas Arnett, Simpsonville, SC (US); Matthew Joseph Laylock, Easley, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 16/784,781

(22) Filed: Feb. 7, 2020

(65) Prior Publication Data

US 2021/0246534 A1 Aug. 12, 2021

(51) Int. Cl.
*C22C 19/05* (2006.01)
*F01D 5/14* (2006.01)

(52) U.S. Cl.
CPC .............. *C22C 19/057* (2013.01); *F01D 5/14* (2013.01); *F05D 2300/177* (2013.01)

(58) Field of Classification Search
CPC ........ C22C 19/057; C22C 19/056; C22F 1/10
See application file for complete search history.

(56) References Cited

U.S. PATENT DOCUMENTS

| 2,951,757 | A | 9/1960 | Brown |
| 3,890,816 | A | 6/1975 | Allen et al. |
| 4,825,522 | A | 5/1989 | Iwai et al. |
| 6,908,518 | B2 | 6/2005 | Bouse et al. |
| 2003/0103862 | A1 | 6/2003 | Bouse et al. |
| 2010/0008778 | A1 | 1/2010 | Patrick et al. |
| 2011/0052443 | A1 | 3/2011 | Hanlon et al. |
| 2018/0223395 | A1 * | 8/2018 | Mourer ................. F01D 25/005 |

FOREIGN PATENT DOCUMENTS

| CN | 113249618 A | 8/2021 |
| EP | 0 789 087 A1 * | 8/1997 | ............ C22C 19/05 |
| JP | 2021123797 A | 8/2021 |
| WO | 2018216067 A1 | 11/2018 |
| WO | 2019077333 A1 | 4/2019 |

OTHER PUBLICATIONS

International Search Report for corresponding EP Application No. 21153114.0-1103 dated Mar. 3, 2021; 32 pages.

* cited by examiner

*Primary Examiner* — Jessee R Roe
(74) *Attorney, Agent, or Firm* — James Pemrick; Hoffman Warnick LLC

(57) ABSTRACT

A nickel-based superalloy composition including by weight percent: Cobalt 7.5; Chromium 9.75; Aluminum 5.45; Titanium 1.0; Niobium 3.5; Tungsten 6.0; Molybdenum 1.5; Carbon 0.08; Hafnium 0.15; Boron 0.01; and Nickel 65.0; and incidental impurities.

18 Claims, 2 Drawing Sheets

NICKEL-BASED SUPERALLOYS

The disclosure relates generally to nickel-based superalloys, and more particularly, to nickel-based superalloys with properties including enhanced weldability, heat treat characteristics, high temperature longitudinal and transverse creep strengths, hot corrosion resistance, and resistance to oxidation.

BRIEF DESCRIPTION

A first aspect of the disclosure provides a nickel-based superalloy composition including by weight percent: Cobalt 7.5; Chromium 9.75; Aluminum 5.45; Titanium 1.0; Niobium 3.5; Tungsten 6.0; Molybdenum 1.5; Carbon 0.08; Hafnium 0.15; Boron 0.01; and Nickel 65.0; and incidental impurities.

A second aspect of the disclosure provides a composition comprising, by weight percent: Cobalt 5.0 to 10.0; Chromium 7.0 to 12.0; Aluminum 4.2 to 6.0; Titanium 0 to 3.5; Niobium 2.5 to 4.5; Tungsten 4.0 to 8.0; Molybdenum 0.5 to 2.5; Carbon up to 0.15; Hafnium up to 0.2; Boron up to 0.02; and remainder nickel and incidental impurities.

A third aspect of the disclosure provides an article of manufacture. The article is formed from a nickel-based superalloy, the nickel-based superalloy includes by weight percent: Cobalt 7.5; Chromium 9.75; Aluminum 5.45; Titanium 1.0; Niobium 3.5; Tungsten 6.0; Molybdenum 1.5; Carbon 0.08; Hafnium 0.15; Boron 0.01; and Nickel 65.0; and incidental impurities.

A fourth aspect of the disclosure provides a gas turbine. The gas turbine comprises a hot gas path component. The component includes a nickel-based superalloy, wherein the nickel-based superalloy includes by weight percent Cobalt 7.5; Chromium 9.75; Aluminum 5.45; Titanium 1.0; Niobium 3.5; Tungsten 6.0; Molybdenum 1.5; Carbon 0.08; Hafnium 0.15; Boron 0.01; and Nickel 65.0; and incidental impurities.

The aspects of the present disclosure are intended to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
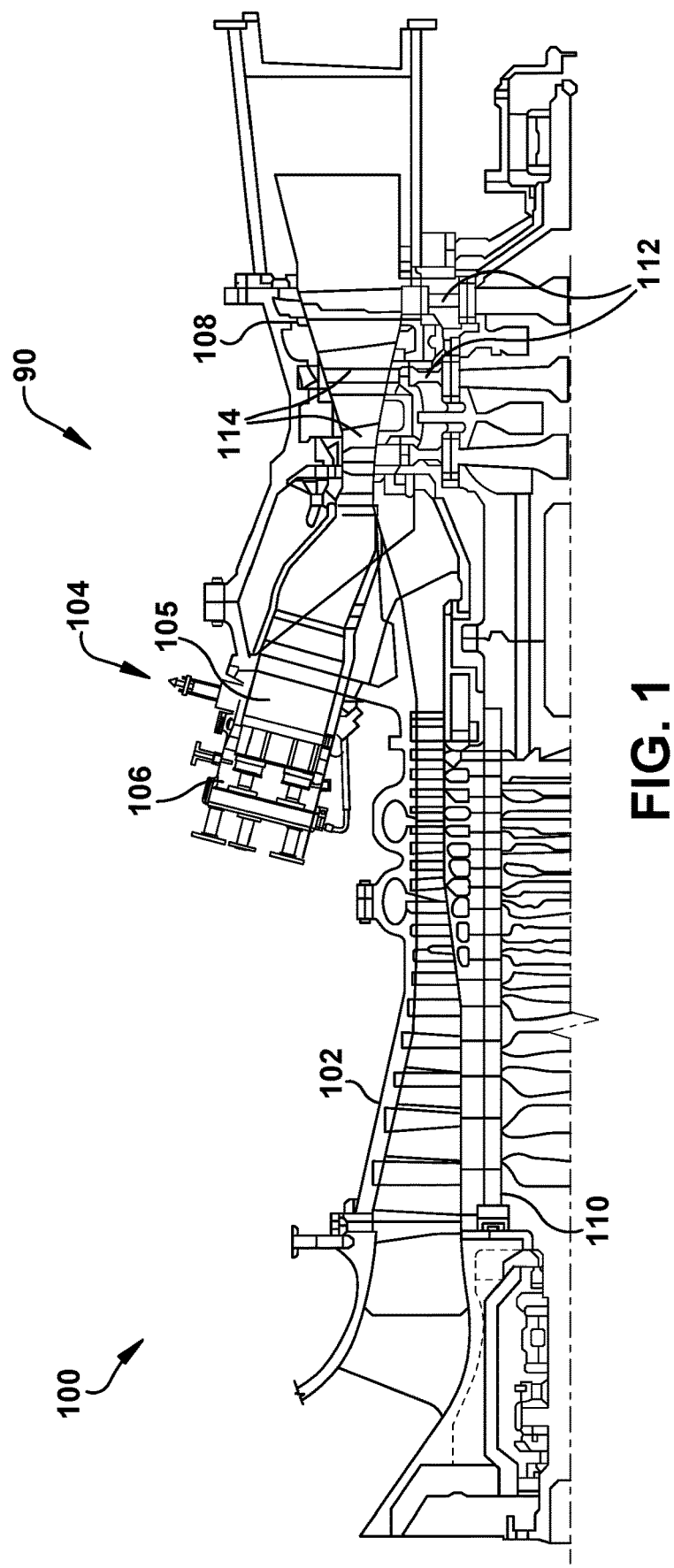
FIG. 1 illustrates a gas turbine engine with locations where blades of the instant embodiments may be employed.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant components within a turbine system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Components located in a high temperature section (also known as "hot gas path") of a gas turbine, are typically formed of superalloys, which includes nickel-based superalloys, iron-based superalloys, cobalt-based superalloys, and combinations thereof. Blades formed of superalloy GTD-444 are used as latter stage blades for high efficiency engines, such as General Electric models FB and H. GTD-444 blades typically exhibit acceptable creep resistance properties. However, GTD-444 superalloy is hard to weld since this alloy contains higher gamma prime (approx. 60%) in the matrix. Thus, welding of GTD-444 may produce cracking in the base metal heat affected zone and in weld metal. As used herein, "GTD-444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel. GTD-444 is available from General Electric Company, Boston, Mass.

Figure 2:
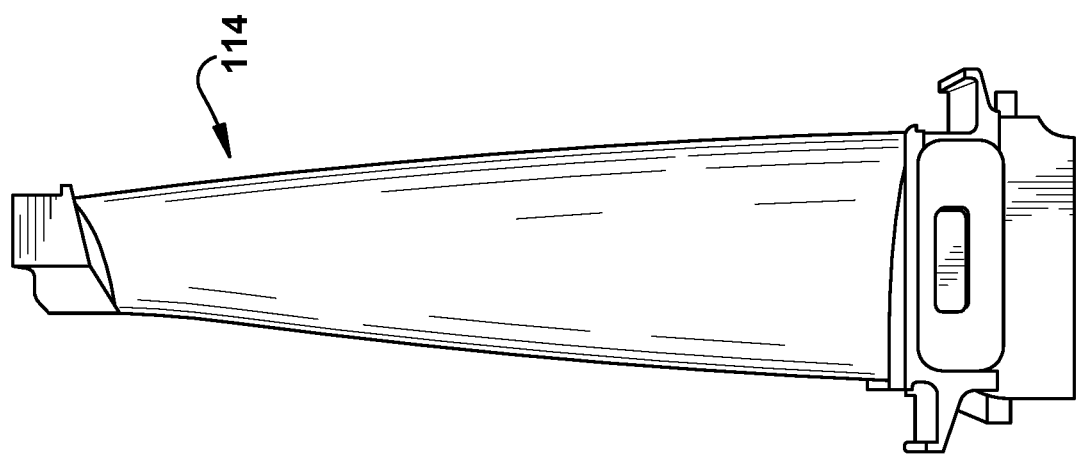
FIG. 2 illustrates an example of a blade that can be fabricated from a superalloy of the embodiments.

With reference to FIGS. 1 and 2, a turbomachine 90 in the form of a combustion turbine or gas turbine (GT) system 100 (hereinafter 'GT system 100') is illustrated. GT system 100 includes a compressor 102 and a combustor 104. Combustor 104 includes a combustion region 105 and a fuel nozzle assembly 106. GT system 100 also includes a turbine 108 and a common compressor/turbine shaft 110 (hereinafter referred to as 'rotor 110'). In one embodiment, GT system 100 is a 7HA.03 engine, commercially available from General Electric Company, Boston, Mass. A set of stationary vanes or nozzles 112 cooperate with a set of rotating blades 114 to form each stage of turbine 108, and to define a portion of a flow path through turbine 108.

Different hot gas path sections of the gas turbine system 100 may experience different operating conditions requiring materials forming components therein to have different properties. In fact, different components in the same sections may experience different operating conditions requiring different materials.

Turbine blades 114 or airfoils in the turbine section of the engine are attached to turbine wheels and rotate at very high speeds in the hot exhaust combustion gases expelled by turbine 108. These blades or airfoils must be oxidation-resistant and corrosion-resistant, maintaining their microstructure at elevated operating temperatures while maintaining mechanical properties, such as creep resistance/stress rupture, strength, and ductility. Because these blades have complex shapes, in order to reduce costs, they may be formed by an appropriate manner, such as casting, additively manufacturing, forging, or other suitable processes that reduce processing time as well as machining time to achieve complex shapes.

As noted above, nickel-based superalloys have been used for hot gas path components as they provide desired properties that withstand operating conditions of the turbine. Nickel-based superalloys have high temperature capabilities and strength from precipitation strengthening mechanisms that include gamma prime ($\gamma'$) precipitates. Gamma prime ($\gamma'$) is $Ni_3(Al, Ti)$ and a primary strengthening phase in nickel-based superalloys. It is a coherently precipitating phase (i.e., the crystal planes of the precipitate are in registry with the gamma matrix) with an ordered $L1_2$ (fcc) crystal structure.

The nickel-based superalloys are utilized for blades, which can be made from nickel-based superalloys such as René N4, René N5 that form high volume fractions of gamma prime ($\gamma'$) precipitates when heat-treated appropriately, and GTD®-111, Rene 80 and In 738, which form somewhat lower volume fractions of gamma prime ($\gamma'$) precipitates when heat-treated appropriately. GTD® is a trademark of General Electric Company, Boston, Mass. Other nickel-based superalloys forming lower volume fractions of gamma prime ($\gamma'$), such as GTD® 222 and IN 939, can be used in lower temperature gas turbine system applications, such as nozzle or exhaust applications.

Nickel-based superalloys, as embodied by the disclosure and including compositions as in the ranges and amounts herein, are useful in hot gas path sections of turbines since they can provide desired properties that withstand operating conditions of the gas turbine's harsh environment.

In the following discussions of constituent amounts, the term "up to" means that a value can be essentially zero or trace amounts, and the constituent may be provided in an amount that increases "up to" until it reaches that upper amount. Thus, if a constituent "X" amount is "up to 12.3" X can be 0.0, or 12.3, or any amount between 0.0 and 12.3 inclusive of both 0.0 and 12.3.

In one aspect of the embodiments, a nickel-based superalloy composition is provided. The nickel-based superalloy composition includes, by weight percent constituents: Cobalt 5.0 to 10.0; Chromium 7.0 to 12.0; Aluminum 4.2 to 6.0; Titanium 0.75 to 3.5; Niobium 2.5 to 4.5; Tungsten 4.0 to 8.0; Molybdenum 0.5 to 2.5; Carbon up to 0.15; Hafnium up to 0.2; Boron up to 0.02; and remainder Nickel and incidental impurities.

In a further embodiment, a nickel-based superalloy composition includes, by weight percent constituents: Cobalt 7.0 to 8.0; Chromium 9.0 to 11.0; Aluminum 5.0 to 5.5; Titanium 0.75 to 1.5; Niobium 3.0 to 4.0; Tungsten 5.0 to 7.0; Molybdenum 1.0 to 2.0; Carbon up to 0.10; Hafnium up to 0.2; Boron up to 0.02; and remainder Nickel and incidental impurities.

In yet another embodiment of the nickel-based superalloy composition, the nickel-based superalloy includes, by weight percent: Cobalt 7.50; Chromium 9.75; Aluminum 5.45; Titanium 1.0; Niobium 3.5; Tungsten 6.0; Molybdenum 1.5; Carbon 0.08; Hafnium 0.15; Boron 0.01; and Nickel 65.0 with incidental impurities.

Table I below sets forth several compositions for nickel-based superalloys in accordance with embodiments of the disclosure. In Table I, a composition of GE's GTD-444 constituents is also included for reference purposes only.

TABLE I

| | composition wt % Composition of Alloy | | | | | | | | | | | |
|---|---|---|---|---|---|---|---|---|---|---|---|---|
| alloy | Ni | Co | Cr | Al | Ti | Ta | Nb | W | Mo | C | Hf | B |
| Alloy 1 | Balance | 7.5 | 9.75 | 5.45 | 1.0 | 0.0 | 3.5 | 6.0 | 1.5 | 0.06 | 0.15 | 0.01 |
| Alloy 2 | Balance | 7.5 | 9.75 | 5.14 | 1.63 | 0.0 | 3.5 | 6.0 | 1.5 | 0.06 | 0.15 | 0.01 |
| Alloy 3 | Balance | 7.5 | 9.75 | 4.5 | 2.88 | 0.0 | 3.5 | 6.0 | 1.5 | 0.06 | 0.15 | 0.01 |
| GTD-444 | Balance | 7.5 | 9.75 | 4.2 | 3.5 | 4.8 | 0.50 | 6.0 | 1.5 | 0.06 | 0.15 | 0.01 |

The nickel-based superalloy, as per Alloys 1, 2, and 3, includes a larger weight percentage of niobium compared to other nickel-based superalloys, including but not limited to GTD-444. Niobium provides a nickel-based superalloy, as embodied herein, to have enhanced weldability compared to other nickel-based superalloys, including but not limited to GTD-444.

Moreover, the higher aluminum weight percentage content of a nickel-based superalloy, as embodied herein, enables higher oxidation resistance compared to other nickel-based superalloys, including but not limited to GTD-444.

Further, compared to other nickel-based superalloys, at least an absence of tantalum, alone or in combination with: cobalt in the presence of carbon; amounts of tungsten and tantalum; an increasing ratio of Al to Ti, as embodied in nickel-based superalloys of the disclosure, enables reduced low-cycle fatigue and creep attributes. Accordingly, with the reduction of both physical properties, which impact turbine life, blades with the nickel-based superalloys, according to the disclosure, may have extended life.

Another aspect of the nickel-based superalloy, according to embodiments of the disclosure, is a beneficial relationship between weight percentages of titanium and aluminum. Because higher elevated temperature strength as well as resistance to stress rupture is required in hot gas paths of gas turbines, low gamma prime ($\gamma'$) materials are not generally suitable for hot gas path parts, such as combustor or turbine applications. Additional Al and/or Ti included in nickel-based superalloys develop gamma prime ($\gamma'$) that strengthens nickel-based superalloys. Medium and high gamma prime ($\gamma'$) strengthened nickel-based superalloys provide additional strength needed for use in combustor and turbine sections of turbine engines.

Nickel-based superalloys, as embodied by the disclosure, can provide desired physical and metallurgical properties that satisfy demanding operating conditions of hot gas path components in gas turbines. Sections of the turbine where nickel-based superalloys, according the embodiments, may be applied include, but are not limited to, hot gas path components including turbine blades; turbine nozzles; casings; housings; compressor parts; shrouds; vanes; diaphragms; combustion liners, parts, and transition pieces, and the like, especially subject to high operating temperatures and/or harsh environments.

Additionally, nickel-based superalloys, as embodied by the disclosure and including compositions as in the ranges and amounts herein, can be used in a multitude of manufacturing processes. Processes that can use nickel-based superalloys, as embodied by the disclosure, include but are not limited to, additive manufacturing; casting; forging; vacuum melting, such as vacuum arc remelting; welding, brazing, bonding, soldering, or joining; use a repair filler material, coupon, plug, and/or wire fill; 3D printing where nickel-based superalloys, as embodied herein, are provided in a powder or granular form; hot isostatic press processes; powder metallurgical processes; binder jet processes, and other processes now known or hereafter later developed.

Moreover, nickel-based superalloys, as embodied by the disclosure and including compositions as in the ranges and amounts herein, can be provided for use in various forms, which may facilitate application and/or use. For example, and in no way limiting of the disclosure's embodiments, nickel-based superalloys can be provided as a raw forging, billet, ingot, powdered superalloy material, wire form, pelletized, or any other appropriate form now known or hereafter later developed.

Additionally, dependent on processing applied to nickel-based superalloys, as embodied by the disclosure, can be equiaxed, directionally solidified, and single-crystal grain orientations, or any other form now known or hereafter later developed.

Al and Ti increase the volume fraction of gamma prime ($\gamma'$) in the superalloy of the application, as noted above. Increasing volume fraction of gamma prime ($\gamma'$) increases the creep resistance of the superalloy. The strength of the superalloy increases with increasing Al+Ti. Strength also increases with an increasing ratio of Al to Ti.

Moreover, Al increases the oxidation resistance of nickel-based superalloys, in accordance with embodiments herein.

Co is added and is believed to improve the stress and creep-rupture properties of nickel-based superalloys, in accordance with embodiments herein.

Cr increases the oxidation and hot corrosion resistance of nickel-based superalloy, in accordance with embodiments herein. Cr is also believed to contribute to solid solution strengthening of nickel-based superalloys, in accordance with embodiments herein, at high temperatures and improved creep-rupture properties in the presence of C.

C contributes to improved creep-rupture properties of nickel-based superalloys, in accordance with embodiments herein. C interacts with Cr, and possibly other elements, to form grain boundary carbides.

Ta, W, Mo, and Re are higher melting refractory elements that improve creep-rupture resistance. These elements may contribute to solid solution strengthening of the $\gamma$ matrix. Mo and W reduce diffusivity of hardening elements such as Ti, thereby extending the amount of time required for coarsening of gamma prime ($\gamma'$) improving high temperature properties such as creep-rupture. Ta and W also may substitute for Ti in formation of gamma prime ($\gamma'$) in nickel-based superalloys, in accordance with embodiments herein.

Nb may be included to promote the formation of gamma prime ($\gamma'$) and may substitute for Ti in the formation of gamma prime ($\gamma'$) in nickel-based superalloys, in accordance with embodiments herein as previously noted. Moreover as noted above, in nickel-based superalloys, Nb increases weldability of nickel-based superalloys, according to the compositions embodied by the disclosure.

Hf, B, and Zr are added in low weight percentages to nickel-based superalloys to provide grain boundary strengthening. Boride formation may form in grain boundaries to enhance grain boundary ductility. Zirconium also is believed to segregate to grain boundaries and may help tie up any residual impurities while contributing to ductility. Hafnium contributes to formation of γ-gamma prime (γ') eutectic in nickel-based superalloys, as well as to promotion of grain boundary of gamma prime (γ') which contributes to ductility. The gamma prime (γ') volume fraction of the nickel-based superalloy of the embodiments herein is higher than that of conventional GTD-444.

Creep strength at gas turbine operating temperatures is related to gamma prime (γ') amount, and operating temperatures are affected by the γ' solvus temperature. The γ' solvus temperature is the temperature at which gamma prime (γ') begins to solutionize or dissolve in the superalloy matrix. Thus raising γ' solvus temperatures maintains strength as γ' itself is maintained in the nickel-based superalloy. Thus, it follows that an amount of gamma prime (γ') also is related to nickel-based superalloy strength. Nickel-based superalloys of embodiments herein possess a high gamma prime (γ') volume fraction (between about 60 and about 65 volume percent (%) and a high γ' solvus temperature (≥2200 F)).

Also, nickel-based superalloys of the embodiments herein exhibit higher oxidation resistance at gas turbine operating conditions and environments in part due to the aluminum content, when compared to GTD-444.

Moreover, nickel-based superalloys of the embodiments herein have low-cycle fatigue (LCF) and creep properties at gas turbine operating conditions and environments in part due to tungsten and titanium content, as compared to GTD-444.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A composition comprising, by weight percent:
Cobalt 5.0 to 10.0;
Chromium 7.0 to 12.0;
Aluminum 4.2 to 6.0;
Titanium 0.75 to 1.5;
Niobium 2.5 to 4.5;
Tungsten 4.0 to 8.0;
Molybdenum 0.5 to 2.5;
Carbon up to 0.15;
Hafnium up to 0.2;
Boron up to 0.02;
the composition including 0.0 Zirconium; and
remainder nickel and incidental impurities.

2. The composition of claim 1, wherein by weight percent:
Cobalt 7.0 to 8.0;
Chromium 9.0 to 11.0;
Aluminum 5.0 to 5.5;
Titanium 0.75 to 1.5;
Niobium 3.0 to 4.0;
Tungsten 5.0 to 7.0;
Molybdenum 1.0 to 2.0;
Carbon up to 0.10;
Hafnium up to 0.2;
Boron up to 0.02; and
remainder nickel and incidental impurities.

3. The composition of claim 1, further including gamma prime (γ') between about 60 and about 65 volume percent (%) of the composition.

4. The composition of claim 3, wherein a gamma prime (γ') solvus temperature of the composition is in a range between about 2050° F. and about 2250° F.

5. The composition of claim 1, wherein the composition is powder.

6. A composition comprising, by weight percent:
Cobalt 7.5;
Chromium 9.75;
Aluminum 5.45;
Titanium 1.0;
Niobium 3.5;
Tungsten 6.0;
Molybdenum 1.5;
Carbon 0.08;
Hafnium 0.15;
Boron 0.01; and
Nickel 65.0;
and incidental impurities.

7. The composition of claim 6, further including gamma prime (γ') between about 60 and about 65 volume percent (%) of the composition.

8. The composition of claim 7, wherein a gamma prime (γ') solvus temperature of the composition is in a range between about 2050° F. and about 2250° F.

9. The composition of claim 6, wherein the composition is powder.

10. An article of manufacture, the article comprising a nickel-based superalloy, the nickel-based superalloy includes by weight percent:
Cobalt 7.5;
Chromium 9.75;
Aluminum 5.45;
Titanium 1.0;
Niobium 3.5;
Tungsten 6.0;
Molybdenum 1.5;

Carbon 0.08;
Hafnium 0.15;
Boron 0.01; and
Nickel 65.0;
and incidental impurities.

11. The article of manufacture of claim 10, wherein gamma prime (γ') is between about 60 and about 65 volume percent (%) of the nickel-based superalloy.

12. The article of manufacture of claim 10, wherein a gamma prime (γ') solvus temperature of the nickel-based superalloy is in a range between about 2050° F. and about 2250° F.

13. The article of manufacture of claim 10, wherein the article is a gas turbine hot gas path component.

14. The article of manufacture of claim 13, where the gas turbine hot gas path component includes a rotating blade.

15. A gas turbine, the gas turbine comprising a hot gas path component, the component including a nickel-based superalloy, wherein the nickel-based superalloy includes by weight percent:
Cobalt 7.5;
Chromium 9.75;
Aluminum 5.45;
Titanium 1.0;
Niobium 3.5;
Tungsten 6.0;
Molybdenum 1.5;
Carbon 0.08;
Hafnium 0.15;
Boron 0.01; and
Nickel 65.0;
and incidental impurities.

16. The gas turbine of claim 15, wherein the hot gas path component includes turbine blades; turbine nozzles; casings; housings; compressor parts; shrouds; vanes; diaphragms; combustion liners, parts, and transition pieces.

17. The gas turbine of claim 15, wherein the composition includes gamma prime (γ') is between about 60 and about 65 volume percent (%) of the nickel-based superalloy.

18. The gas turbine of claim 17, wherein a gamma prime (γ') solvus temperature of the nickel-based superalloy is in a range between about 2050° F. and about 2250° F.

* * * * *